United States Patent [19]

Distler et al.

[11] 3,944,690

[45] Mar. 16, 1976

[54] PRODUCTION OF NONWOVEN FABRICS

[75] Inventors: Dieter Distler, Mutterstadt; Kurt Wendel, Ludwigshafen; Andreas Einwiller, Mannheim; Knut Oppenlaender, Ludwigshafen, all of Germany

[73] Assignee: BASF Aktiengesellschaft, Ludwigshafen (Rhine), Germany

[22] Filed: Jan. 30, 1975

[21] Appl. No.: 545,758

Related U.S. Application Data

[63] Continuation-in-part of Ser. No. 362,901, May 23, 1973, Pat. No. 3,878,152.

[30] Foreign Application Priority Data

Dec. 29, 1972 Germany............................ 2263921
May 30, 1972 Germany............................ 2226269
Feb. 10, 1973 Germany............................ 2306541

[52] U.S. Cl. ................. 427/390; 427/389; 427/392
[51] Int. Cl.$^2$ ........................................ D06M 15/12
[58] Field of Search................... 427/389, 390, 392; 428/290

[56] References Cited
UNITED STATES PATENTS

| | | | |
|---|---|---|---|
| 2,805,210 | 9/1957 | Stoner et al. ...................... | 260/29.7 |
| 2,912,349 | 11/1959 | Videen et al. ...................... | 117/103 |
| 2,931,749 | 4/1960 | Kine et al. ........................... | 154/101 |
| 2,982,682 | 5/1961 | Matlin et al. ....................... | 154/101 |
| 3,101,292 | 8/1963 | Kine et al. ........................... | 161/227 |

*Primary Examiner*—John Kight, III.
*Attorney, Agent, or Firm*—Johnston, Keil, Thompson, & Shurtleff

[57] ABSTRACT

Nonwovens of natural and synthetic fibers which are bonded uniformly over the whole cross-section are obtained by using as binders aqueous polymer dispersions containing as heat-sensitizing agents alkoxylated amines having inverse solubility and a pH of less than 6.

8 Claims, No Drawings

PRODUCTION OF NONWOVEN FABRICS

This application is a continuation-in-part of U.S. application Ser. No. 362,901, filed May 23, 1973, now U.S. Pat. No. 3,878,152.

This application discloses and claims subject matter described in German Patent application P 22 26 269.7, filed May 30, 1972, German Patent application P 22 63 921.0, filed Dec. 29, 1972 and German Patent application P 23 06 541.0, filed Feb. 10, 1973, which are incorporated herein by reference.

This invention relates to the production of bonded nonwovens employing heat-sensitized polymer dispersions.

It is known to prepare bonded nonwovens from natural and/or synthetic fibers by impregnating the unbonded webs with aqueous polymer dispersions, separating excess impregnating liquid from the impregnated webs, and drying the latter usually at elevated temperature, e.g., above 60°C, frequently from 60° to 160°C. To make the bonded webs as resistant as possible to organic solvents used in dry cleaning it is advisable to crosslink the polymers by drying at above 100°C. A multiplicity of aqueous polymer dispersions are known and suitable for bonding the fibers in unbonded webs, e.g., in the processes of German Printed applications DAS 1,159,384 and 1,172,853 and U.S. Pat. No. 2,724,707 and 2,868,754 aqueous dispersions of butadiene copolymers are used which contain polymerized units of, predominantly, acrylonitrile and/or styrene, and minor amounts of acrylic acid and/or acrylamide. In the process of German Printed application DAS 1,579,082 (British 1,178,754) the binders are aqueous dispersions of copolymers containing 40 to 95 wt percent of butadiene, 0 to 55 percent of styrene and/or acrylonitrile, 0 to 5 percent of ethylenically unsaturated carboxylic acids such as acrylic, methacrylic and itaconic acid, 1 to 7 percent of (meth)acrylamide and/or its N-methylol derivatives, and 0.1 to 3 percent of polymerizable compounds having at least two isolated double bonds. In the processes taught in German Printed Applications DAS 1,086,208 and 1,277,191 and British 880,993 aqueous dispersions of acrylic ester copolymers may be used which contain units of acrylic and/or methacrylic esters of alkanols containing 1 to 8 carbon atoms. Aqueous dispersions of copolymers of vinyl esters are also suitable (see for instance German application DAS 1,086,208 and Belgian 705,248). Other examples of the numerous patents disclosing aqueous polymer dispersions as binders for nonwovens are German Printed applications DAS 1,134,353; 1,135,412; and 1,159,384; German Laid-Open applications DOS 2,035,847 and 1,902,459; U.S. Pat. Nos. 3,101,292; 2,931,749; and 2,982,682; British 914,714 and 867,545; and Belgian 654,817. All these specifications are incorporated herein as references.

Binders of the said type are used for example for bonding nonwovens of cotton, wool, rayon staple, silk or synthetic fibers, e.g., of polyacrylonitrile, polyamides such as polyhexamethylene adipamide, and saturated polyesters such as polyethylene glycol terephthalate, and of mineral fibers, e.g., glass fibers, asbestos fibers and rockwool. The binders are suitable for the production of needle-punched fabrics, filter mats, leather-like materials, fabrics for the clothing industry, industrial nonwoven materials, needlepunched carpeting, etc. These materials are used for producing bed linen, tablecloths, surgical dressings, dusters, decorative materials, blinds, etc.

In the prior art processes, the unbonded webs may be bonded with the aqueous polymer dispersions by spraying, padding or impregnating; for instance, the webs may be passed through an impregnating bath and the excess liquor squeezed out between two rollers. The binder-containing webs are then dried, during which process the binder copolymer may, and particularly at temperatures of more than 100°C, crosslink. Usually, thermal treatment of only a few minutes' duration is sufficient to crosslink the prior art crosslinkable binders. Catalysts, e.g., acids or acid-yielding compounds such as phosphoric acid, maleic acid, ammonium nitrate, magnesium chloride and ammonium oxalate are often added to the binder dispersions to accelerate the crosslinking reaction.

When nonwovens are bonded using aqueous polymer dispersion of the said type difficulties are incurred particularly during drying and when the webs are relatively thick, because the polymer particles migrate to the surface of the webs. The avoidance of this migration phenomenon is of particular importance in the case of thick webs (cf. German Laid-Open application DOS 2,035,847). Attempts have therefore been made to curb migration of the polymer particles by shock drying, i.e., initial drying at fairly high temperatures; however, this measure is generally insufficiently successful. It has also been attempted to flocculate the polymer dispersion onto the material to be bonded by adding coagulants, or in the case of natural or synthetic rubber latices by adding heat sensitizers. Finally, it has in practice been possible to suppress migration to a certain extent by adding sodium alginate or polyacrylic acid salts to the impregnating liquor. However, the effect of these art measures for preventing migration is unsatisfactory. In particular, the handle of materials prepared in such a manner is frequently too harsh and their fastness to water is poor as a result of the addition of polar products. Even the addition of water-soluble polymers of N-vinylcaprolactam to the aqueous polymer dispersions as taught in German Laid-Open application DOS 2,035,847 is incapable of satisfactorily preventing migration of the polymer particles on drying.

We have now found that nonwovens may be advantageously bonded by impregnating the nonwovens in conventional manner with aqueous polymer dispersions, followed by drying, when polymer dispersions are used which have been heat-sensitized by the addition of alkoxylated amines of inverse solubility and by adjusting the pH to below 6 if not already below 6.

Suitable synthetic anionic and non-ionic aqueous primary dispersions of polymers are for example those of monoolefins and diolefins, particularly ethylene and butadiene, of monovinylaromatic compounds, particularly styrene, vinyl toluenes, α-methylstyrene and o-chlorostyrene, of vinyl halides and/or vinylidene halides, particularly vinyl chloride and vinylidene chloride, of monoolefinically unsaturated carboxylates usually containing form 3 to 20 and in particular from 4 to 14 carbon atoms, such as vinyl esters of saturated straight-chain or branched-chain aliphatic carboxylic acids, e.g. vinyl acetate, vinyl propionate, vinyl n-butyrate, vinyl pivalate, vinyl laurate and vinyl stearate, of alkyl acrylates and alkyl methacrylates, such as methyl acrylate, methyl methacrylate, ethyl acrylate, n-butyl acrylate, n-butyl methacrylate, t-butyl acrylate, n-hexyl acrylate, n-hexyl methacrylate, 2-ethylhexyl acrylate, 2-ethylhexyl methacrylate, n-decyl acrylate and n-dodecyl methacrylate, and of dialkyl esters of $\alpha,\beta$-monoolefinically unsaturated dicarboxylic acids, such as the dimethyl, diethyl, di-n-butyl and di-n-hexyl esters of maleic acid, fumaric acid and itaconic acid, and of vinyl ethers such as vinyl ethyl ether, vinyl methyl ether, vinyl n-butyl ether and vinyl s-butyl ether. The aqueous polymer dispersions of the above kinds may contain polymerized units of one or more of said monomers. Of particular interest are for example the usual aqueous dispersions of ethylene/vinyl acetate copolymers, copolymers of butadiene, styrene and/or acrylonitrile, acrylate copolymers, acrylate/styrene copolymers, vinyl chloride/acrylate copolymers, vinylidene chloride/acrylate copolymers, vinyl chloride/vinylidene chloride copolymers and vinylidene chloride/acrylonitrile copolymers.

The polymer dispersions of this kind may also contain, in quantities ranging from about 3 to 20 percent of the weight of the polymer, nitriles of $\alpha,\beta$-olefinically unsaturated carboxylic acids, such as in particular acrylonitrile, and also, in amounts usually ranging from 0.5 to 10 percent and in particular from 0.5 to 5 percent by weight, olefinically unsaturated monomers having reactive groups, which are often soluble in water, for example $\alpha,\beta$-unsaturated, usually $C_{3-5}$ mono- and di-carboxylic acids, such as acrylic acid, methacrylic acid, crotonic acid, maleic acid, fumaric acid and itaconic acid and their amides which may be substituted by methylol groups at the nitrogen atom or which are substituted by $C_{1-4}$ alkoxymethyl groups, for example acrylamide, methacrylamide, N-methylol acrylamide, maleic amide and maleic imide, hydroxyalkyl acrylates and methacrylates such as glycol monoacrylate and monomethacrylate, butanediol-1,4-monoacrylate and monomethacrylate, monoalkyl esters of $\alpha,\beta$-olefinically unsaturated dicarboxylic acids of the above kinds, such as in particular monoethyl maleate and mono-n-butyl maleate, heterocyclic vinyl compounds such as N-vinyl pyrrolidone and N-vinylimidazole, monomers having a number of isolated double bonds such as divinyl benzene, methylene-bis-acrylamide and diallyl phthalate, and also vinylsulfonic acid and its esters and alkali metal salts, in the form of polymerized units.

The polymer dispersions may be manufactured with the use of conventional anionic and/or non-ionic emulsifiers and optionally conventional protective colloids. Examples of suitable emulsifying and dispersing agents are alkyl sulfates, such as lauryl sulfate, alkali metal salts of fatty acids, such as sodium stearate and potassium oleate, alkyl sulfonates, ethoxylated alkyl phenols having $C_{o-12}$ alkyl groups and exhibiting from 5 to 30 and in particular from 10 to 25 ethylene oxide radicals, and their sulfonation products and alkoxylated, in particular ethoxylated, fatty alcohols, fatty amines and fatty acids, and possibly, in minor quantities, polyvinyl alcohol, partially saponified vinyl acetate polymers, carboxymethyl cellulose and hydroxyethyl cellulose. The amount of emulsifiers in the polymer dispersions is generally between 0 and 5 percent and preferably between 0.1 and 2 percent by weight, based on the weight of the polymer, the dispersions often containing both anionic and non-ionic emulsifiers. The polymer dispersions having particle diameters of more than 0.2 $\mu u$, on average, usually contain 0.1 to 1 percent by weight of emulsifier, and polymer dispersions having particle diameters of less than 0.2 $\mu u$, on average, usually contain from 1 to 4 percent and in particular from 1 to 2 percent of emulsifier, based on the weight of the polymers.

In our novel process, alkoxylated amines having inverse water solubility are added to the polymer dispersions of the above kind. Thus the water solubility of the alkoxylated amines used as sensitizers is greater at lower temperatures, e.g. room temperature, than at elevated temperatures, e.g. at 50°or 90°C. The alkoxylated amines may be derived from monofunctional or polyfunctional amines generally having from 1 to 10 and preferably from 1 to 3 amino groups. Of particular interest are amines having 2 amino groups. The amino groups in the alkoxylated amines may be primary, secondary or tertiary amino groups. The alkoxylated amines are preferably derived from straight-chain or branched-chain aliphatic amines, particularly polyfunctional straight-chain aliphatic amines such as ethylene diamine, diethylene triamine, dipropylene triamine, triethylene tetramine and tetraethylene pentamine, and also from ethanolamine, diethanolamine and triethanolamine, ethylene diamine being of particular interest. The alkoxy radical of the alkoxylated amines may, in particular, be derived from ethylene oxide and/or propylene oxide. If the alkoxylated amines are derived from ethylene oxide and propylene oxide, the ethylene oxide and propylene oxide may be attached, in the usual way, either randomly or as blocks. We prefer the alkoxylated amines to contain attached propylene oxide or ethylene oxide and propylene oxide when they are derived from alkyl amines containing a total of up to 4 carbon atoms in the molecule. Where the alkoxylated amines are derived from alkyl amines having more than 4 carbons and in particular more than 8 carbons in the molecule, they may contain attached radicals of ethylene oxide along, propylene oxide alone or ethylene oxide and propylene oxide together.

When the alkoxylated amines contain ethylene oxide and propylene oxide, it has been found advantageous if the amount of attached porpylene oxide increases with increasing amounts of amino groups in the amine used as starting material. The molar ratio of ethylene oxide to propylene oxide in such alkoxylated amines is frequently between 1:10 and 1:1 and the means molecular weight of the alkoxylated amines is generally between about 200 and 15,000 and preferably between 800 and 6,000 (measured by determining the hydroxyl number by the acetic anhydride method). The means molecular weight of propoxylated amines, containing attached propylene oxide only, is generally between 600 and 1,400. In general, the alkoxylated amines have a turbidity point between about 10°and 70°C in 1 percent aqueous solution. Particularly interesting alkoxylated amines are those derived from ethylene diamine by the addition of propylene oxide or of ethylene oxide and propylene oxide in a molar ratio of from 1:1 to 1:5, the ethylene oxide and propylene oxide radicals being distributed randomly or as blocks.

In our novel process the alkoxylated amines of the above kinds may be added in amounts usually of from 1 to 20 percent and preferably from 2 to 10 percent by weight of the polymers, to the polymer dispersions which generally have a polymer content of from 5 to 60 percent and in particular from 20 to 50 percent by weight, the addition being made at room temperature. The amount of alkoxylated amine necessary in each to achieve the desired heat-sensitizing effect in the various types of dispersion may be readily determined by simple experiments. To achieve heat-sensitization, the pH of the mixture is adjusted to below 6, if the starting polymer dispersion has a pH of 6 or more, this adjustment being carried out immediately or, if desired, after storage. To this end, use may be made of, say, dilute mineral acids such as hydrochloric, sulfuric and phosphoric acids, or organic acids such as acetic acid. Preferably the pH is set to below 4 and in particular at a value between 1 and 3, and in the case of pH between 4 and 6 it has been found advantageous also to add to the mixture electrolytes such as sodium chloride or magnesium chloride in amounts of from about 1 to 3 percent by weight, based on the weight of the polymer. If the starting polymer dispersion has a pH of less than 6 and in particular from 1 to 3, and the alkoxylated amines having inverse solubility are added thereto, acidification is unnecessary. In such cases, it may sometimes be advantageous to add electrolytes or to lower the pH further, for example from 5 to 2, in order to increase the heat-sensitizing effect. In some cases it may even be convenient to add the alkoxylated amines and dilute acids together to polymer dispersions having a pH of 6 or more.

For the production of nonwoven fabrics by the process of the invention conventional natural or synthetic fibers are suitable. Impregnation of the unbonded webs with the heat-sensitized polymer dispersions of a pH of below 6 and drying of the impregnated material are carried out in conventional manner. The heat-sensitized polymer dispersions may also be foamed in known manner.

Examples of particularly suitable heat-sensitized polymer dispersions are those given in Examples 4, 6, 12, 16, 17 and 18 of application Ser. No. 362,901. The dispersion of Example 6 is particularly suitable for the present process for bonding leather replacement materials, and the dispersion of Example 12 for bonding needlepunched fabrics.

Bonded nonwovens of natural or synthetic fibers are obtained by our novel process which exhibit no migration of the polymer particles as they coagulate almost immediately upon commencement of drying.

EXAMPLE 1 a. A conventional nonwoven fabric (product weight 50 g/m$^2$) of 100 percent polyhexamethylene adipamide fibers (3.3 dtex, 40 mm) is bonded with a sensitized dispersion diluted to a 20 percent solids content in conventional manner by impregnating, followed by drying of the impregnated web. The weight ratio of fiber : butyl acrylate copolymer is 2:1 and drying is carried out for 6 minutes at 150°C. There is obtained a nonwoven material which is uniformly bonded over its whole cross-section and whose top and bottom surfaces are identical. b. By contrast, a poorly bonded web is obtained under otherwise the same conditions when the binder is a dispersion of the same composition but which contains no sensitizing agent; furthermore, the surfaces of the web have differing properties.

EXAMPLES 2 and 3 a. The procedure of Example 1 a) is adopted except that impregnation is carried out with sensitized dispersion diluted to 20 wt percent on fabrics (product weight in each case: 45 g/m$^2$) consisting of 100 percent rayon staple (2) and polyethylene glycol terephthalate fibers (3) (in each case 1.7 dtex, 40 mm). Nonwoven fabrics are obtained which are uniformly bonded over the whole cross-section and whose top and bottom surfaces are identical. b. By contrast, poorly bonded webs exhibiting different properties at the top and bottom surfaces are obtained when, under otherwise the same conditions, the binder is a dispersion of the same composition but which contains no sensitizing agent.

EXAMPLE 4 a. A needlepunched fabric (product weight 400 g/m$^2$) consisting of 60 wt percent of polyhexamethylene adipamide fibers and 40 wt percent of polyethylene glycol terephthalate fibers is impregnated with the sensitized dispersion diluted to 30 wt percent such that the ratio of fiber weight : butyl acrylate copolymer is 1:1, and dried in conventional manner for 10 minutes at 150°C. A fabric is obtained which is uniformly bonded over its whole cross-section and whose top and bottom surfaces are identical. b. The procedure of Example 4 a) is adopted except that the nonsensitized dispersion is used. Under otherwise the same conditions a poorly bonded fabric is obtained which exhibits different properties at the top and bottom surfaces.

EXAMPLE 5

The procedure of Example 4 a) is adopted except that a needlepunched fabric (product weight 350 g/m$^2$) is used consisting of 30 wt percent of polyethylene glycol terephthalate fibers, 50 wt percent of polycaprolactam fibers and 20 wt percent of viscose fibers. In this instance, too, only when employing the heat-sensitized dispersion is a fabric obtained which is uniformly bonded over its whole cross-section and which exhibits the same properties at its top and bottom surfaces.

EXAMPLE 6

The procedure of Example 4 a) is adopted except that a needle-punched web (product weight 400 g/m$^2$) is used consisting of 60 wt percent of polyhexamethylene adipamide fibers, 30 wt percent of polyethylene glycol terephthalate fibers and 10 wt percent of polypropylene fibers. In this case, too, only when employing the heat-sensitized dispersion is a fabric obtained which is uniformly bonded over its whole cross-section and which exhibits the same properties at its top and bottom surfaces.

EXAMPLE 7

The procedure of Example 1 a) is adopted except that a web is used (product weight 60 g/m$^2$) consisting of equal parts by weight of polyhexamethylene adipamide fibers and polyacrylonitrile fibers. Here, too, only when the heat-sensitized dispersion is used is a fabric obtained which is uniformly bonded over its whole cross-section and which exhibits the same properties at its top and bottom surfaces.

EXAMPLE 8

To 100 parts of a 20 percent (40percent) aqueous dispersion of a copolymer of 50 parts of n-butyl acrylate, 48 parts of styrene and 2 parts of methacrylic acid containing 1.5 parts of the sodium salt of a $C_{16-18}$ alkyl sulfonate as emulsifier, there are added 1.6 parts (3.2 parts) of the sensitizer A, whereupon the pH is adjusted to 2 (1.9) by the addition of dilute aqueous hydrochloric acid. There is obtained a polymer dispersion which coagulates virtually completely within a few second at 45°C (37.5°C). The sensitized dispersion is suitable as a binder for non-woven fabrics.

EXAMPLE 9

To 100 parts of a conventionally prepared 20 percent aqueous dispersion of a copolymer of 47 parts of n-butyl acrylate, 51 parts of vinyl acetate and 2 parts of acrylic acid, containing 2 percent, based on the polymer, of lauryl sulfate as emulsifier, there are added 1.6 parts of sensitizer A, whereupon the pH is adjusted to 2. There is obtained a sensitized polymer dispersion which coagulates virtually completely within a few seconds at 45°C. The sensitized dispersion is suitable for making coatings, textile finishes and for use as a binder for leather-like non-woven webs.

EXAMPLE 10

To 100 parts of a conventionally prepared 20 percent aqueous dispersion of a copolymer of 69 parts of butadiene, 30 parts of acrylonitrile and 1 part of N-methylol methacrylamide, containing 1.5 parts of sodium lauryl sulfate as emulsifier, there are added 5 percent by weight, based on the amount of polymer, of sensitizer H and 2 parts of maleic acid. There is obtained a heat-sensitive polymer dispersion having a pH of 3.6 and a coagulation temperature of 42.5°C. The sensitized dispersion is suitable for binding needlepunched nonwoven webs serving, for example, as starting materials for the manufacture of leather substitutes.

EXAMPLE 11

To a conventionally prepared 35 percent aqueous dispersion of a copolymer of 87 parts of n-butyl acrylate, 10 parts of acrylonitrile, 2 parts of N-butoxymethyl methacrylamide and 1 part of acrylic acid, containing 0.8 part of the sodium salt of a $C_{12-14}$ alkylaryl sulfonate and 0.5 part of sodium pyrophosphate and having a pH of 4, there is added 0.7 part of a polyadduct of 25 moles of propylene oxide and 6 moles of ethylene oxide per mole of ethylene diamine. The resulting mixture has a pH of 4.3 and coagulates completely within a few seconds when heated to 52°C. This dispersion is suitable for use as a binder in nonwoven webs.

EXAMPLE 12

To 100 parts of a 30 percent aqueous dispersion of a conventionally prepared copolymer of 50 parts of styrene and 50 parts of n-butyl acrylate, containing 0.8 part of the sodium salt of lauryl sulfonate and 0.3 part of a $C_{12-16}$ fatty acid amido N-n-propylbetaine mixture

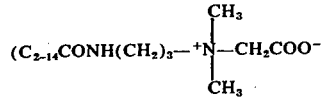

as emulsifier and having a pH of 2.6, there are added, at room temperature, 1.2 parts of a polyadduct of 20 moles of propylene oxide and 5 moles of ethylene oxide per mole of ethylene diamine.

The resulting mixture has a pH of 3 and coagulates quickly and completely when heated to 68°C. The mixture is readily foamable and is suitable for use in foamed form for foam-impregnating nonwoven fabrics, in which case it coagulates when heated immediately after impregnation to at least 68°C to stiffen to nonwoven fabric whilst showing virtually no migration of the binder polymer.

We claim:

1. In a process for binding nonwoven fabrics by impregnating the fabrics with anionic or non-ionic aqueous heat-sensitized polymer dispersions and drying the impregnated fabrics at elevated temperature in the usual manner, the improvement of using a polymer dispersion containing 2 to 10 percent by weight, based on the polymer, of a polyalkoxylated aliphatic amine containing from 1 to 10 amino groups and being alkoxylated with an alkylene oxide selected from the group consisting of ethylene oxide, propylene oxide, and both ethylene and propylene oxides, said polyalkoxylated amine having inverse solubility and a mean molecular weight of from 200 to 15,000, as measured by the hydroxyl number determined by the acetic anhydride method, and said polymer dispersion containing said polyalkoxylated amine having a pH below 6.

2. Aa processs as claimed in claim 1, wherein said alkoxylated amine is a polyoxypropylated aliphatic amine having 1 to 4 carbon atoms and 1 to 3 amino groups, said polyoxypropylated amine having a mean molecular weight of from 800 to 6000, as measured aforesaid.

3. A process as claimed in claim 1, wherein said alkoxylated amine is an aliphatic amine with 1 to 4 carbon atoms and 1 to 3 amino groups and the oxyalkylene groups thereof are those of both ethylene oxide and propylene oxide in a molar ration between 1:10 and 1:1, respectively, said polyalkoxylated amine having a mean molecular weight of from 800 to 6,000 as measured aforesaid.

4. A process as claimed in claim 1, wherein said aliphatic amine has more than 4 carbon atoms and 1 to 3 amino groups.

5. A process as claimed in claim 1, wherein said alkoxylated amine is ethylene diamine, diethylene triamine, triethylene tetramine, tetraethylene pentamine or dipropylene triamine which is oxyalkylated with both ethylene oxide and propylene oxide in a mole ratio of said oxides of 1:10 to 1:1, respectively.

6. A process as claimed in claim 1, wherein said alkoxylated amine is polyoxypropylated triethanolamine, diethanolamine, or ethanolamine.

7. A process as claimed in claim 1, wherein said alkoxylated amine is polyoxypropylated ethylene diamine.

8. A process as claimed in claim 1, wherein said oxyalkylated amine is ethylene diamine which is oxyalkylated with both ehtylene oxide and propylene oxide in a mole ratio of said oxides of 1:10 to 1:1, respectively.

* * * * *

UNITED STATES PATENT AND TRADEMARK OFFICE
CERTIFICATE OF CORRECTION

PATENT NO : 3,944,690
DATED : March 16, 1976
INVENTOR(S) : DISTLER et al

It is certified that error appears in the above-identified patent and that said Letters Patent are hereby corrected as shown below:

In Column 7, the formula in Example 12, delete
" $(C_{2-14}CONH(CH_2)_3 \ldots$ " and substitute -- $(C_{12-14}CONH(CH_2)_3$ --

In Column 8, Line 61, delete "... ehtylene oxide and ..." and substitute --... ethylene oxide and ... --

Signed and Sealed this

Second Day of November 1976

[SEAL]

Attest:

RUTH C. MASON
*Attesting Officer*

C. MARSHALL DANN
*Commissioner of Patents and Trademarks*